United States Patent
Hu et al.

(10) Patent No.: US 10,633,578 B2
(45) Date of Patent: Apr. 28, 2020

(54) SALT TOLERANT SETTLING RETARDANT PROPPANTS

(71) Applicant: HALLIBURTON ENERGY SERVICES, INC., Houston, TX (US)

(72) Inventors: Yuntao Thomas Hu, The Woodlands, TX (US); Travis Hope Larsen, Houston, TX (US); Corneliu Stanciu, Kingwood, TX (US); Ajish Potty, Stafford, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/536,094

(22) PCT Filed: Feb. 18, 2015

(86) PCT No.: PCT/US2015/016426
§ 371 (c)(1),
(2) Date: Jun. 14, 2017

(87) PCT Pub. No.: WO2016/133506
PCT Pub. Date: Aug. 25, 2016

(65) Prior Publication Data
US 2018/0002594 A1    Jan. 4, 2018

(51) Int. Cl.
*C09K 8/02*    (2006.01)
*C09K 8/80*    (2006.01)
(Continued)

(52) U.S. Cl.
CPC .............. *C09K 8/805* (2013.01); *C09K 8/02* (2013.01); *C09K 8/665* (2013.01); *C09K 8/68* (2013.01);
(Continued)

(58) Field of Classification Search
CPC ...... C09K 2208/04; C09K 8/02; C09K 8/665; C09K 8/68; C09K 8/80; C09K 8/805; C09K 8/88; E21B 43/267
See application file for complete search history.

(56) References Cited

U.S. PATENT DOCUMENTS

| 6,047,772 A | 4/2000 | Weaver et al. |
| 2006/0068014 A1* | 3/2006 | Munro ................. A61L 15/425 424/487 |

(Continued)

OTHER PUBLICATIONS

PCT International Search Report and Written Opinion, dated Dec. 9, 2015, Appl No. PCT/US2015/016426, "Salt Tolerant Settling Retardant Proppants", filed Feb. 18, 2015.

(Continued)

*Primary Examiner* — Alicia Bland
(74) *Attorney, Agent, or Firm* — Thomas Rooney; C. Tumey Law Group PLLC

(57) ABSTRACT

A method of treating a subterranean formation including suspending proppant particulates in a treatment fluid, wherein the proppant particles include a coating comprising a salt-tolerant, water-swellable polymer, and the treatment fluid includes at least one fluid consisting of fresh water, salt water, seawater, brine, an aqueous salt solution, and combinations thereof; and introducing the treatment fluid containing the settling retardant proppant particulates into the subterranean formation. A composite proppant particle includes a proppant substrate and a salt tolerant polymeric layer deposited on the proppant substrate.

13 Claims, 1 Drawing Sheet

(51) Int. Cl.
*E21B 43/267* (2006.01)
*C09K 8/66* (2006.01)
*C09K 8/88* (2006.01)
*C09K 8/68* (2006.01)

(52) U.S. Cl.
CPC .................. *C09K 8/80* (2013.01); *C09K 8/88* (2013.01); *E21B 43/267* (2013.01); *C09K 2208/04* (2013.01)

(56) References Cited

U.S. PATENT DOCUMENTS

| | | | |
|---|---|---|---|
| 2008/0207779 A1* | 8/2008 | Yahiaoui | C08F 220/34 424/487 |
| 2011/0120719 A1 | 5/2011 | Soane et al. | |
| 2013/0233545 A1* | 9/2013 | Mahoney | C09K 8/80 166/280.2 |
| 2013/0324443 A1 | 12/2013 | Wang et al. | |
| 2014/0000891 A1* | 1/2014 | Mahoney | C09K 8/805 166/280.2 |
| 2014/0014348 A1 | 1/2014 | Mahoney et al. | |
| 2014/0352969 A1* | 12/2014 | Chung | C09K 8/588 166/308.3 |

OTHER PUBLICATIONS

Cai, Wensheng et al., 'Thermosensitive and ampholytic hydrogels for salt solution', Journal of Applied Polymer Science, 2003, vol. 88, No. 8, pp. 2032-2037.

* cited by examiner

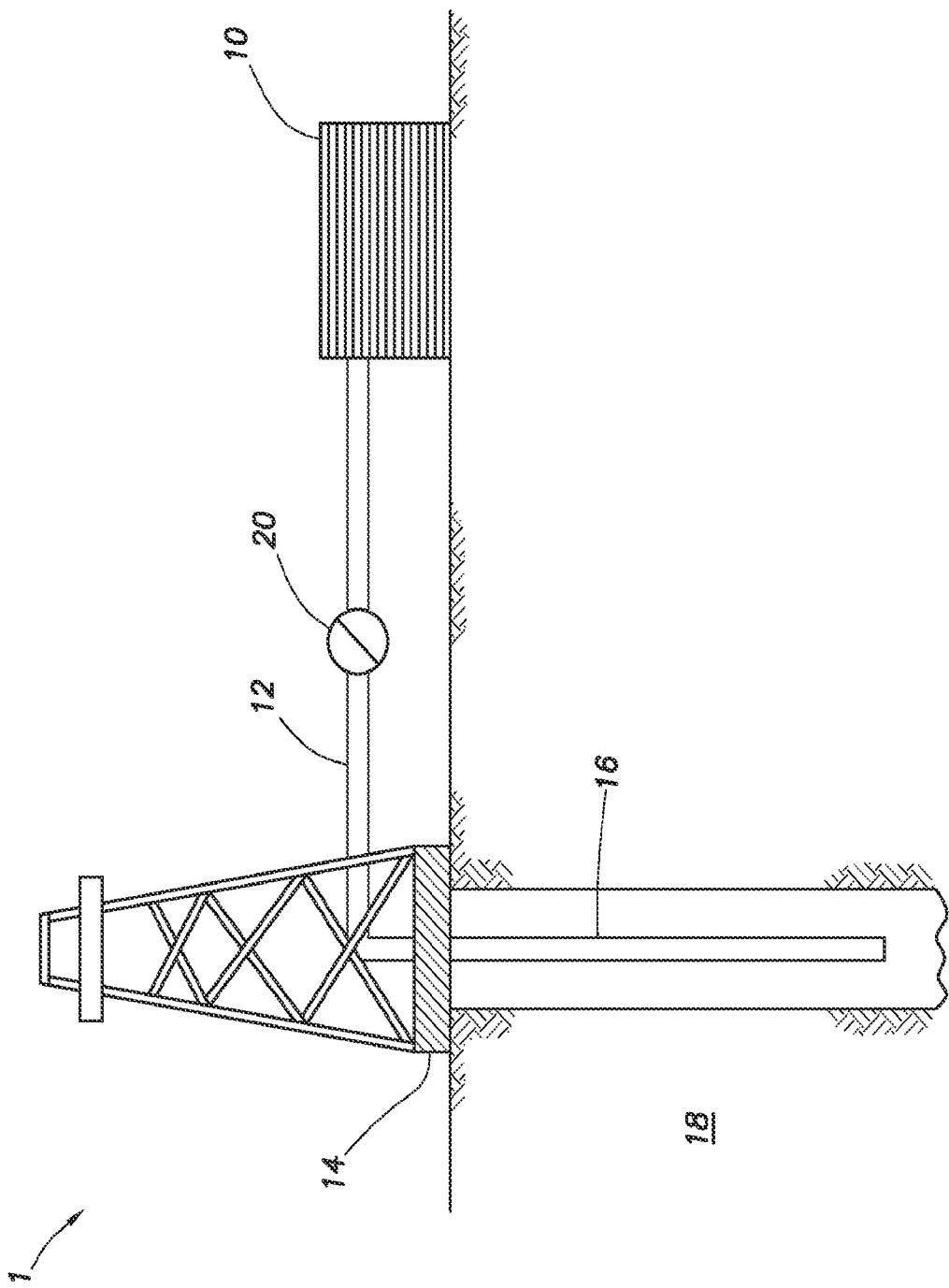

SALT TOLERANT SETTLING RETARDANT PROPPANTS

BACKGROUND

The present invention generally relates to the use of proppants in subterranean operations, and, more specifically, to treatment fluids comprising salt tolerant settling retardant proppants, and methods of using these treatment fluids in subterranean operations.

Subterranean wells (e.g., hydrocarbon fluid producing wells and water producing wells) are often stimulated by hydraulic fracturing treatments. In a typical hydraulic fracturing treatment, a treatment fluid is pumped into a wellbore in a subterranean formation at a rate and pressure above the fracture gradient of the particular subterranean formation so as to create or enhance at least one fracture therein. Particulate solids (e.g., graded sand, bauxite, ceramic, nut hulls, and the like), or "proppant particulates," are typically suspended in the treatment fluid or a second treatment fluid and deposited into the fractures while maintaining pressure above the fracture gradient. The proppant particulates are generally deposited in the fracture in a concentration sufficient to form a tight pack of proppant particulates, or "proppant pack," which serves to prevent the fracture from fully closing once the hydraulic pressure is removed. By keeping the fracture from fully closing, the interstitial spaces between individual proppant particulates in the proppant pack form conductive pathways through which produced fluids may flow.

In traditional hydraulic fracturing treatments, the specific gravity of the proppant particulates may be high in relation to the treatment fluids in which they are suspended for transport and deposit in a target interval (e.g., a fracture). Therefore, the proppant particulates may settle out of the treatment fluid and fail to reach the target interval. For example, where the proppant particulates are to be deposited into a fracture, the proppant particulates may settle out of the treatment fluid and accumulate only or substantially at the bottommost portion of the fracture, which may result in complete or partial occlusion of the portion of the fracture where no proppant particulates have collected (e.g., at the top of the fracture). As such, fracture conductivity and production over the life of a subterranean well may be substantially impaired if proppant particulates settle out of the treatment fluid before reaching their target interval within a subterranean formation.

One way to compensate for proppant particulate settling is to introduce the proppant particulates into the fracture in a viscous gelled fluid. Gelled fluids typically require high concentrations of gelling agents and/or crosslinker, particularly when transporting high concentrations of proppant particulates in order to maintain them in suspension. As many gelling and crosslinking agents are used in a variety of fluids within and outside of the oil and gas industry, their demand is increasing while their supply is decreasing. Therefore, the cost of gelling and crosslinking agents is increasing, and consequently, the cost of hydraulic fracturing treatments requiring them is also increasing. Additionally, the use of gelling and crosslinking agents may result in premature viscosity increases that may cause pumpability issues or problems with subterranean operations equipment.

Proppants coated with a water-swellable polymer have also been used to combat settling by reducing the effective density of the proppant; however, the polymers used in existing technologies are sensitive to the presence of salts, which causes proppant suspension to decrease significantly in water with high total dissolved solids (TDS). See, for example, Self-Suspending Proppant, R. P. Mahoney et al., SPE 163818, 2013. Treatment fluids with moderate to high ionic strength, e.g., brines and clay stabilizers, are commonly used in treatment fluids. The degree of success of a hydraulic fracturing operation depends, at least in part, upon fracture conductivity after the fracturing operation has ceased and production commenced, creating the need for products and methods that hinder the settling of proppant particulates in a treatment fluid.

BRIEF DESCRIPTION OF THE DRAWINGS

The following FIGURE is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

FIG. 1 depicts an embodiment of a system configured for delivering the consolidating agent composition comprising treatment fluids of the embodiments described herein to a downhole location.

DETAILED DESCRIPTION

Embodiments of the invention are directed to settling retardant proppants comprising a proppant particle and a salt tolerant polymer coating. When the proppant is dispersed in water, the polymer coating swells as it becomes hydrated. This polymer expansion increases the volume of the proppant particle, and the low-density of the polymer coating may result in a significant reduction in the effective particle density. This reduction in particle density, along with an increase in fluid viscosity attributed to the swollen particles, may allow the proppant to suspend in water. The use of polymers that are specifically designed to tolerate or resist salt-induced intra- or interpolymer bridging effects, enables the modified proppant to self-suspend in TDS water, which is a significant advantage over existing technology.

As used herein, a "settling retardant" particle is one that has a lower density than the suspending medium, and has resistance to settling due to the force of gravity.

In certain embodiments of the present invention, a method of treating in a subterranean formation comprises: suspending proppant particulates in a treatment fluid, wherein the proppant particles include a coating comprising a salt-tolerant, water-swellable polymer, and the treatment fluid comprises at least one fluid consisting of fresh water, salt water, seawater, brine, an aqueous salt solution, and combinations thereof; and introducing the treatment fluid containing the settling retardant proppant particulates into the subterranean formation. In some embodiments, the salt-tolerant polymer may comprise at least one compound selected from the group consisting of ampholyte polymers including nonionic monomers, cationic monomers, and anionic monomers; N-isopropylacrylamide/[[3-(methacryloylamino)propyl]dimethy(3-sulfopropyl)ammonium hydroxide] (NIPAAm/MPSA) copolymer hydrogels; polyacrylic acid/silica composite hybrid hydrogels; poly allyl amine; agmatine; tris-2-aminoethylamine; polyhexamethylene biguanide; polyethyleneimine; glycosaminoglycan molecules modified to include a methacryl group; and combinations thereof. In exemplary embodiments, the anionic monomer may be 2-acrylamido-2-methylpropane sulfonic acid or a salt thereof; the cationic monomer is selected from acryloyloxy ethyl trimethyl ammonium chloride; methacrylamidopropyltrimethyl ammonium chloride; and combinations thereof; and the nonionic monomer is acrylamide. In other embodiments, the anionic monomer is about 5% to about 15% w/w and the cationic monomer is about 50% to about 60% w/w. In an embodiment, the glycosaminoglycan molecules modified to include a methacryl group consist of at least one of chondroitin sulfate, hyaluronan, and combinations thereof. In some embodiments, the treatment fluid may be a brine consisting of at least one of sodium chloride brines, sodium bromide brines, potassium chloride brines, potassium bromide brines, magnesium chloride brines, calcium chloride brines, calcium bromide brines, and combinations thereof. In certain embodiments, the proppants are at least one selected from the group consisting of sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. In other embodiments, the subterranean formation comprises at least one fracture and wherein the introducing further comprises placing at least a portion of the settling retardant proppant particulates into the at least one fracture. In yet another embodiment, the subterranean formation comprises a gravel packing screen creating an annulus between a wellbore in the subterranean formation and the gravel packing screen, and the introducing further comprises placing the settling retardant proppant particulates in the annulus between the wellbore in the subterranean formation and the gravel packing screen.

Some embodiments of the present invention provide a method of treating in a subterranean formation comprising: introducing a treatment fluid containing settling retardant proppant particulates into the subterranean formation, wherein the proppant particles include a coating comprising a salt-tolerant, water-swellable polymer, and the treatment fluid comprises at least one fluid consisting of fresh water, salt water, seawater, brine, an aqueous salt solution, and combinations thereof. In some embodiments, the salt-tolerant polymer may comprise at least one compound selected from the group consisting of ampholyte polymers including nonionic monomers, cationic monomers, and anionic monomers; N-isopropylacrylamide/[[3-(methacryloylamino)propyl]dimethy(3-sulfopropyl)ammonium hydroxide] (NIPAAm/MPSA) copolymer hydrogels; polyacrylic acid/silica composite hybrid hydrogels; poly allyl amine; agmatine; tris-2-aminoethylamine; polyhexamethylene biguanide; polyethyleneimine; glycosaminoglycan molecules modified to include a methacryl group; and combinations thereof. In exemplary embodiments, the anionic monomer may be 2-acrylamido-2-methylpropane sulfonic acid or a salt thereof; the cationic monomer is selected from acryloyloxy ethyl trimethyl ammonium chloride; methacrylamidopropyltrimethyl ammonium chloride; and combinations thereof; and the nonionic monomer is acrylamide. In other embodiments, the anionic monomer is about 5% to about 15% w/w and the cationic monomer is about 50% to about 60% w/w. In an embodiment, the glycosaminoglycan molecules modified to include a methacryl group consist of at least one of chondroitin sulfate, hyaluronan, and combinations thereof.

Another embodiment of the invention is directed to a composite proppant particle, comprising: a proppant substrate; and a polymeric layer deposited on the proppant substrate, wherein the polymeric layer comprises at least one compound selected from the group consisting of ampholyte polymers including nonionic monomers, cationic monomers, and anionic monomers; N-isopropylacrylamide/[[3-(methacryloylamino)propyl]dimethy(3-sulfopropyl)ammonium hydroxide] (NIPAAm/MPSA) copolymer hydrogels; polyacrylic acid/silica composite hybrid hydrogels; poly allyl amine; agmatine; tris-2-aminoethylamine; polyhexamethylene biguanide; polyethyleneimine; glycosaminoglycan molecules modified to include a methacryl group; and combinations thereof. In some embodiments, the polymeric layer is deposited on the proppant substrate by at least one of solution coating, dry coating, spray coating, surface polymerization, and combinations thereof. In exemplary embodiments, the anionic monomer may be 2-acrylamido-2-methylpropane sulfonic acid or a salt thereof; the cationic monomer is selected from acryloyloxy ethyl trimethyl ammonium chloride; methacrylamidopropyltrimethyl ammonium chloride; and combinations thereof; and the nonionic monomer is acrylamide. In other embodiments, the anionic monomer is about 5% to about 15% w/w and the cationic monomer is about 50% to about 60% w/w. In an embodiment, the glycosaminoglycan molecules modified to include a methacryl group consist of at least one of chondroitin sulfate, hyaluronan, and combinations thereof.

In an exemplary embodiment, a well treatment system comprises: a well treatment apparatus, including a mixer and a pump, configured to: suspend proppant particulates in a treatment, wherein the proppant particles include a coating comprising a salt-tolerant, water-swellable polymer, and the treatment fluid comprises at least one fluid consisting of fresh water, salt water, seawater, brine, an aqueous salt solution, and combinations thereof; and introduce the treatment fluid containing the settling retardant proppant particulates into a subterranean formation.

One of skill in the art may appreciate that the coated proppants of the disclosure allow for high proppant transport in TDS water or sea water. The proppants may lower the probability of screen outs. Additionally, the proppants may allow for a simplified treatment procedure due to having to transport fewer raw materials to the site, and having fewer raw materials to combine prior to pumping the treatment fluids downhole.

Aqueous Treatment Fluids

The aqueous treatment fluid of the present embodiments can generally be from any source, provided that the fluids do not contain components that might adversely affect the stability and/or performance of the treatment fluids of the present invention. In various embodiments, the aqueous treatment fluid can comprise fresh water, salt water, seawater, brine, or an aqueous salt solution. In some embodiments, the aqueous treatment fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 g/cm$^3$ or greater).

In some embodiments, the aqueous treatment fluid is present in the treatment fluid the amount of from about 85% to about 98% by volume of the treatment fluid.

Coating Polymers

Many high molecular weight (e.g., >500 kDa) salt tolerant water soluble polymers and their mixtures may be used for coating the proppant particles. In one embodiment, the coating is an ampholyte polymer comprising nonionic, cationic, and anionic monomers. Examples of such polymers include a terpoylmer comprising acrylamide, a sulfonic acid-containing monomer (e.g., 2-acrylamido-2-methylpropane sulfonic acid or a salt thereof), and a cationic acid-containing monomer (e.g., acryloyloxy ethyl trimethylammonium chloride, methacrylamidopropyltrimethyl ammonium chloride, or a combination thereof). These polymer may be salt tolerant in up to 250K Ellenberger brine.

In a preferred embodiment, the anionic monomer is 2-acrylamido-2-methylpropane sulfonic acid or a salt thereof, and the cationic monomer is acryloyloxy ethyl trimethyl ammonium chloride, methacrylamidopropyltrimethyl ammonium chloride, or a combination thereof. In a further embodiment, the anionic monomer is about 5% to about 15% w/w and the cationic monomer is about 50% to about 60% w/w.

In another embodiment, N-isopropylacrylamide/[[3-(methacryloylamino)propyl]dimethy(3-sulfopropyl)ammonium hydroxide] (NIPAAm/MPSA) copolymer may be used. This copolymer may form gels that are stable in highly saline environments. As the amount of MPSA in the copolymer increases, the salt resistance may increase. The hydrogels may be prepared by free-radical aqueous-solution polymerization using N,N-methylene-bis(acrylamide) (BIS) as a crosslinking agent with ammonium persulfate and sodium metabisulfite (SBS) acting as redox initiators.

In some embodiments, a polyacrylic acid/silica composite hybrid hydrogel may be used to coat the proppants. The sol-gel reaction involves the hydrolysis of silica precursors and results in hydrogels with high salt tolerance. Acrylic acid and sodium silicate are neutralized with sodium hydroxide and allowed to polymerize. Then N,N'-methylene bisacrylamide (MBAM) and ammonium persulfate are added under heated conditions to initiate polymerization, with the hybrid hydrogel above being the resulting product.

In yet another embodiment, examples of materials that may be used as coating polymers include: poly allyl amine, agmatine, tris-2-aminoethylamine, polyhexamethylene biguanide, and polyethyleneimine. The three factors that may contribute to salt tolerance are net charge, structure of the monomer/polymer, and coating density on the proppant.

In some embodiments, two natural polymers may be used: chondroitin sulfate and hyaluronan. These are glycosaminoglycans (GAG) and their structures are given below as Formula 1 (chondroitin sulfate) and 2 (hyaluronan):

Formula 1

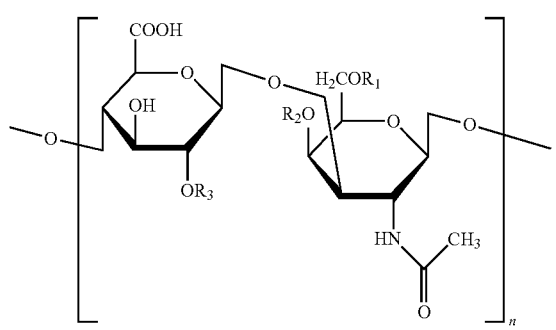

where n is an integer.

Formula 2

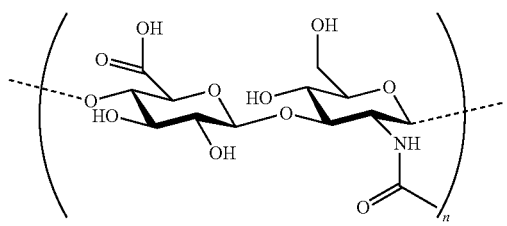

where n is an integer.

GAG-based molecules are found in almost all living organisms, including in humans, most often as part of different mucous membranes. In most cases they contribute to the formation of different gel-like fluids that play important biological roles, e.g., the synovial fluid found in joint cavities. In many cases, the gels they form are extremely tolerant of high salt concentrations. Therefore, these polymers may be successful after simple chemical modifications with acrylic/methacrylic acids or derivatives. The acrylic component may bring in the swellability while the GAG portion may bring in the high salt tolerance, both critical characteristics for a successful proppant.

As an example, Reaction 1 is a method to introduce a methacryl group that may be further polymerized to generate the desired swellable-salt resistant polymers:

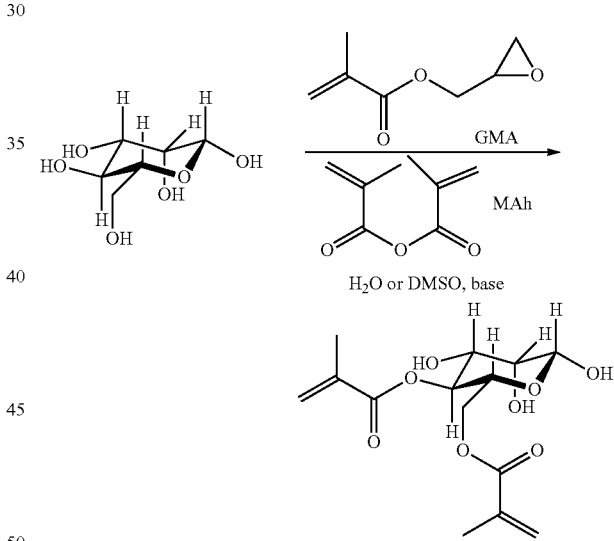

Reaction 1, where GMA is glycidyl methacrylate, MAh is maleic anhydride, and DMSO is dimethyl sulfoxide. The term "methacryl" refers to functional groups including acrylates, methacrylates, acrylamides, methacrylamides, alpha-fluoroacrylates, thioacrylates and thiomethacrylates.

Coating Techniques

The proppant coating may be applied by many techniques. In one embodiment, the polymer is applied by solution coating. In this process a polymer solution is prepared by mixing polymer into a solvent until a homogenous mixture is achieved. Proppant is added to solution, and the solvent is removed under vacuum using a rotary evaporator. The remaining proppant is adsorbed to proppant surface.

In another embodiment, a dry coating technique is used. An adhesion promoter (e.g., functionalized trimethoxysilanes) is added to dry proppant. The solution is mixed by hand, in a speed mixer, or extruder to evenly coat proppant. Liquid polymer is then added to the proppant and mixed until a homogenous coating has developed.

In an embodiment, a spray coating technique is used. Liquid polymer (or polymer solution) is sprayed onto the proppant substrate. The coated proppant is then dried to remove water or carrier fluids.

In yet another embodiment, a surface polymerization technique is used. Precursor monomers are grafted onto a proppant substrate. The proppant is then suspended in a monomer solution and polymerization is initiated. Polymers grow directly from the proppant surface.

In various embodiments, the amount of coating on the proppants is about 0.1 wt. % to about 10 wt. % of the proppant substrate. In another embodiment, the amount of coating is the amount needed to produce a settling retardant proppant particle.

Proppants

In some embodiments, the proppants may be an inert material, and may be sized (e.g., a suitable particle size distribution) based upon the characteristics of the void space to be placed in.

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the treatment fluids in an amount in the range of from an upper limit of about 30 pounds per gallon ("ppg"), 25 ppg, 20 ppg, 15 ppg, and 10 ppg to a lower limit of about 0.5 ppg, 1 ppg, 2 ppg, 4 ppg, 6 ppg, 8 ppg, and 10 ppg by volume of the treatment fluids.

In certain embodiments, the proppants are present in an amount of less than about 5% by volume of the treatment fluid. In other embodiments, the proppants are present in an amount of less than about 3% by volume of the treatment fluid.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The treatment fluids of the present invention may be prepared by any method suitable for a given application. For example, certain components of the treatment fluid of the present invention may be provided in a pre-blended powder or a dispersion of powder in a nonaqueous liquid, which may be combined with the aqueous base fluid at a subsequent time. After the preblended liquids and the aqueous base fluid have been combined polymerization initiators and other suitable additives may be added prior to introduction into the wellbore. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a subterranean formation can include introducing at least into and/or through a wellbore in the subterranean formation. According to various techniques known in the art, equipment, tools, or well fluids can be directed from a wellhead into any desired portion of the wellbore. Additionally, a well fluid can be directed from a portion of the wellbore into the rock matrix of a zone.

In various embodiments, systems configured for delivering the treatment fluids described herein to a downhole location are described. In various embodiments, the systems can comprise a pump fluidly coupled to a tubular, the tubular containing the polymerizable aqueous consolidation compositions and/or the water-soluble polymerization initiator compositions, and any additional additives, disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A: A method of treating in a subterranean formation comprising: suspending settling retardant proppant particulates in a treatment fluid, wherein the settling retardant proppant particles include a coating comprising a salt-tolerant, water-swellable polymer, and the treatment fluid comprises at least one fluid consisting of fresh water, salt water, seawater, brine, an aqueous salt solution, and combinations thereof; and introducing the treatment fluid containing the settling retardant proppant particulates into the subterranean formation.

B: A method of treating in a subterranean formation comprising: introducing a treatment fluid containing settling retardant proppant particulates into the subterranean formation, wherein the settling retardant proppant particles include a coating comprising a salt-tolerant, water-swellable polymer, and the treatment fluid comprises at least one fluid consisting of fresh water, salt water, seawater, brine, an aqueous salt solution, and combinations thereof.

C: A composite proppant particle, comprising: a proppant substrate; and a polymeric layer deposited on the proppant substrate, wherein the polymeric layer comprises at least one compound selected from the group consisting of ampholyte polymers including nonionic monomers, cationic monomers, and anionic monomers; N-isopropylacrylamide/[[3-(methacryloylamino)propyl]dimethy(3-sulfopropyl)ammonium hydroxide] (NIPAAm/MPSA) copolymer hydrogels; polyacrylic acid/silica composite hybrid hydrogels; poly allyl amine; agmatine; tris-2-aminoethylamine; polyhexamethylene biguanide; polyethyleneimine; glycosaminoglycan molecules modified to include a methacryl group; and combinations thereof.

D: A well treatment system comprising: a well treatment apparatus, including a mixer and a pump, configured to: suspend settling retardant proppant particulates in a treatment fluid, wherein the settling retardant proppant particles include a coating comprising a salt-tolerant, water-swellable polymer, and the treatment fluid comprises at least one fluid consisting of fresh water, salt water, seawater, brine, an aqueous salt solution, and combinations thereof; and introduce the treatment fluid containing the settling retardant proppant particulates into a subterranean formation.

Each of embodiments A, B, C and D may have one or more of the following additional elements in any combination: Element 1: wherein the salt-tolerant polymer comprises at least one compound selected from the group consisting of ampholyte polymers including nonionic monomers, cationic monomers, and anionic monomers; N-isopropylacrylamide/[[3-(methacryloylamino)propyl]dimethy(3-sulfopropyl)ammonium hydroxide] (NIPAAm/MPSA) copolymer hydrogels; polyacrylic acid/silica composite hybrid hydrogels; poly allyl amine; agmatine; tris-2-aminoethylamine; polyhexamethylene biguanide; polyethyleneimine; glycosaminoglycan molecules modified to include a methacryl group; and combinations thereof. Element 2: wherein the anionic monomer is 2-acrylamido-2-methylpropane sulfonic acid or a salt thereof; the cationic monomer is selected from acryloyloxy ethyl trimethyl ammonium chloride; methacrylamidopropyltrimethyl ammonium chloride; and combinations thereof; and the nonionic monomer is acrylamide. Element 3: wherein the anionic monomer is about 5% to about 15% w/w and the cationic monomer is about 50% to about 60% w/w. Element 4: wherein the glycosaminoglycan molecules modified to include a methacryl group consist of at least one of chondroitin sulfate, hyaluronan, and combinations thereof. Element 5: wherein the treatment fluid is a brine consisting of at least one of sodium chloride brines, sodium bromide brines, potassium chloride brines, potassium bromide brines, magnesium chloride brines, calcium chloride brines, calcium bromide brines, and combinations thereof. Element 6: wherein the proppants are at least one selected from the group consisting of sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. Element 7: wherein the subterranean formation comprises at least one fracture and wherein the introducing further comprises placing at least a portion of the settling retardant proppant particulates into the at least one fracture. Element 8: wherein the subterranean formation comprises a gravel packing screen creating an annulus between a wellbore in the subterranean formation and the gravel packing screen, and the introducing further comprises placing the settling retardant proppant particulates in the annulus between the wellbore in the subterranean formation and the gravel packing screen. Element 9: wherein the polymeric layer is deposited on the proppant substrate by at least one of solution coating, dry coating, spray coating, surface polymerization, and combinations thereof. Element 10: wherein the amount of coating on the proppants is about 0.1 wt. % to about 10 wt. % of the proppant substrate. Element 11: wherein the amount of coating is the amount needed to produce a settling retardant proppant particle.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of treating in a subterranean formation comprising:

suspending settling retardant proppant particulates in a treatment fluid, wherein the settling retardant proppant particles include a coating comprising a water-swellable polymer comprising an N-isopropylacrylamide/[[3-(methacryloylamino)propyl]dimethy(3-sulfopropyl)ammonium hydroxide] (NIPAAm/MPSA) copolymer hydrogel, and the treatment fluid comprises at least one fluid consisting of fresh water, salt water, seawater, brine, an aqueous salt solution, and combinations thereof; and introducing the treatment fluid containing the settling retardant proppant particulates into the subterranean formation.

2. The method of claim 1, wherein the water-swellable polymer further comprises at least one compound selected from the group consisting of ampholyte polymers, wherein the ampholyte polymers comprise nonionic monomers, cationic monomers, and anionic monomers;

polyacrylic acid/silica composite hybrid hydrogels;
poly allyl amine;
agmatine;
tris-2-aminoethylamine;
polyhexamethylene biguanide;
polyethyleneimine;
glycosaminoglycan molecules modified to include a methacryl group; and combinations thereof.

3. The method of claim 2, wherein the anionic monomer is 2-acrylamido-2-methylpropane sulfonic acid or a salt thereof; the cationic monomer is selected from acryloyloxy ethyl trimethyl ammonium chloride; methacrylamidopropyltrimethyl ammonium chloride; and combinations thereof; and the nonionic monomer is acrylamide.

4. The method of claim 3, wherein the anionic monomer is about 5% to about 15% w/w and the cationic monomer is about 50% to about 60% w/w.

5. The method of claim 2, wherein the glycosaminoglycan molecules modified to include a methacryl group consist of at least one of chondroitin sulfate, hyaluronan, and combinations thereof.

6. The method of claim 1, wherein the treatment fluid is a brine consisting of at least one of sodium chloride brines, sodium bromide brines, potassium chloride brines, potassium bromide brines, magnesium chloride brines, calcium chloride brines, calcium bromide brines, and combinations thereof.

7. The method of claim 1, wherein the proppants are at least one selected from the group consisting of sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof.

8. The method of claim 1, wherein the subterranean formation comprises at least one fracture and wherein the introducing further comprises placing at least a portion of the settling retardant proppant particulates into the at least one fracture.

9. The method of claim 1, wherein the subterranean formation comprises a gravel packing screen creating an annulus between a wellbore in the subterranean formation and the gravel packing screen, and the introducing further comprises placing the settling retardant proppant particulates in the annulus between the wellbore in the subterranean formation and the gravel packing screen.

10. A method of treating in a subterranean formation comprising:

introducing a treatment fluid containing settling retardant proppant particulates into the subterranean formation, wherein the settling retardant proppant particles include a coating comprising a water-swellable polymer, the water-swellable polymer comprising an N-isopropylacrylamide/[[3-(methacryloylamino)propyl]dimethy (3-sulfopropyl)ammonium hydroxide] (NIPAAm/MPSA) copolymer hydrogel; and wherein the treatment fluid comprises at least one fluid consisting of fresh water, salt water, seawater, brine, an aqueous salt solution, and combinations thereof.

11. The method of claim 10, wherein the water swellable polymer further comprises at least one compound selected from the group consisting of:

ampholyte polymers, wherein the ampholyte polymers comprise nonionic monomers, cationic monomers, and anionic monomers;

polyacrylic acid/silica composite hybrid hydrogels;

poly allyl amine;

agmatine;

tris-2-aminoethylamine;

polyhexamethylene biguanide;

polyethyleneimine;

glycosaminoglycan molecules modified to include a methacryl group; and combinations thereof.

12. The method of claim 11, wherein the anionic monomer is 2-acrylamido-2-methylpropane sulfonic acid or a salt thereof; the cationic monomer is selected from acryloyloxy ethyl trimethyl ammonium chloride; methacrylamidopropyltrimethyl ammonium chloride; and combinations thereof; and the nonionic monomer is acrylamide.

13. The method of claim 11, wherein the glycosaminoglycan molecules modified to include a methacryl group consist of at least one of chondroitin sulfate, hyaluronan, and combinations thereof.

* * * * *